United States Patent
Kim et al.

(10) Patent No.: US 7,858,224 B2
(45) Date of Patent: Dec. 28, 2010

(54) BATTERY MODULE HAVING AN IMPROVED UNIT BATTERY ASSEMBLY COUPLING STRUCTURE

(75) Inventors: Tae-Yong Kim, Yongin-si (KR); Hong-Sup Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 437 days.

(21) Appl. No.: 11/515,205

(22) Filed: Sep. 1, 2006

(65) Prior Publication Data

US 2007/0052390 A1    Mar. 8, 2007

(30) Foreign Application Priority Data

Sep. 5, 2005    (KR)    ............... 10-2005-0082216

(51) Int. Cl.
  *H01M 6/46*    (2006.01)
  *H01M 4/00*    (2006.01)
  *H01M 6/42*    (2006.01)

(52) U.S. Cl. ............... 429/153; 429/66; 429/157; 429/159; 429/12

(58) Field of Classification Search ............ 429/66, 429/153, 157, 159, 12
See application file for complete search history.

(56) References Cited

U.S. PATENT DOCUMENTS

| | | | |
|---|---|---|---|
| 2,794,666 A | | 6/1957 | Bishman |
| 4,020,244 A | * | 4/1977 | Selinko ............ 429/100 |
| 4,537,388 A | * | 8/1985 | McCabe ............ 254/232 |
| 4,692,391 A | * | 9/1987 | Hirota ............ 429/34 |
| 5,789,091 A | | 8/1998 | Wozniczka et al. |
| 5,993,987 A | * | 11/1999 | Wozniczka et al. ........ 429/37 |
| 6,040,072 A | | 3/2000 | Murphy et al. |
| 6,410,177 B1 | | 6/2002 | Iyasu et al. |
| 6,696,193 B2 | | 2/2004 | Bonk et al. |
| 6,827,169 B1 | | 12/2004 | Van Hout et al. |
| 2004/0229112 A1 | * | 11/2004 | Sharrow et al. ............ 429/97 |
| 2006/0093890 A1 | * | 5/2006 | Steinbroner ............ 429/37 |

FOREIGN PATENT DOCUMENTS

| | | |
|---|---|---|
| EP | 0 584 639 A1 | 3/1994 |
| EP | 1 117 138 A1 | 7/2001 |

(Continued)

OTHER PUBLICATIONS

Patent Abstracts of Japan for Publication No. Sho 57-31773; dated Feb. 19, 1982 in the name of Shin-Kobe Electric Machinery Co., Ltd.

(Continued)

*Primary Examiner*—Edward Tso
*Assistant Examiner*—Ahmed Omar
(74) *Attorney, Agent, or Firm*—Christie, Parker & Hale, LLP

(57) ABSTRACT

A battery module is provided. The battery module includes a battery body having a plurality of unit cells arranged in series and having a respective barrier disposed between adjacent unit cells. End plates are disposed on opposite outermost sides of the battery body. A fixing unit fixes together the end plates and the battery body by enclosing an outer circumference of an assembly of the end plates and the battery body.

16 Claims, 11 Drawing Sheets

FOREIGN PATENT DOCUMENTS

| | | | |
|---|---|---|---|
| FR | 1267153 | | 7/1961 |
| JP | 57-31773 | * | 2/1982 |
| JP | SHO 57-31773 | | 2/1982 |
| JP | 61-39372 | | 2/1986 |
| JP | 04-343947 | | 11/1992 |
| JP | 05-030593 | | 4/1993 |
| JP | 06-311724 | | 11/1994 |
| JP | 2000-067902 | | 3/2000 |
| JP | 2001-504632 | | 4/2001 |
| JP | 2001-135344 | | 5/2001 |
| JP | 2001-313013 | | 11/2001 |
| JP | 2003-151612 | | 5/2003 |
| JP | 2005-071765 | | 3/2005 |
| JP | 2005-520312 | | 7/2005 |
| KR | 20-1998-0044142 | * | 9/1998 |
| KR | 1998-044142 | | 9/1998 |
| KR | 1020040043432 | * | 5/2004 |
| KR | 10-0488875 | | 5/2005 |
| KR | 1020050113688 A | * | 12/2005 |
| KR | 10-0627285 | | 9/2006 |

OTHER PUBLICATIONS

Patent Abstracts of Japan for Publication No. 2000-067902; dated Mar. 3, 2000 in the name of Toshihiro Matsumoto, et al.

Patent Abstracts of Japan for Publication No. 2001-313013; dated Nov. 9, 2001 in the name of Shuhei Marukawa et al.

Korean Patent Abstracts for Publication No. 1020040043432 A dated May 24, 2004 for Patent No. 10-0488875 dated May 11, 2005 in the name of Jong Hyeon Lee.

Korean Patent Abstracts for Publication No. 1020050113688 A dated Dec. 5, 2005 for Patent No. 10-0627285 dated Sep. 25, 2006 in the name of Seong Jin An et al.

Patent Abstracts of Japan, Publication No. 61-039372; Publication Date: Feb. 25, 1986; in the name of Toshio Hirota.

European Search Report dated May 14, 2007 for corresponding European Patent Application No. 06120031.7.

European Search Report dated Feb. 14, 2007, for EP 06120031.7, in the name of Samsung SDI Co., Ltd.

* cited by examiner

BATTERY MODULE HAVING AN IMPROVED UNIT BATTERY ASSEMBLY COUPLING STRUCTURE

CROSS-REFERENCE TO RELATED APPLICATION

This application claims priority to and the benefit of Korean Patent Application No. 10-2005-0082216 filed on Sep. 5, 2005 at the Korean Intellectual Property Office, the entire contents of which is incorporated herein by reference.

BACKGROUND OF THE INVENTION

1. Field of the Invention

The present invention relates to a battery module, and in particular, to a battery module having an improved unit battery assembly coupling structure to minimize volume.

2. Description of the Related Art

A rechargeable battery module typically includes rechargeable batteries (also known as unit cells) connected in series.

The unit cells each include an electrode assembly having positive and negative electrodes and a separator interposed between the positive and negative electrodes, a case for receiving the electrode assembly, a cap assembly for sealing the case, and positive and negative terminals electrically connected to the positive and negative electrodes, respectively.

The unit cells are typically of a cylindrical or prismatic shape. If the unit cell is a prismatic type, the positive and negative terminals protrude out of the cap assembly so that they are exposed to the outside of the unit cell.

In the battery module having the prismatic type unit cells, the unit cells are arranged so as to alternate positive and negative terminals of one unit cell with the positive and negative terminals of an adjacent unit cell. The positive and negative terminals are connected to each other by an electric conductor. The electric conductor is typically fixed on the positive and negative terminals by nuts screw-coupled to the positive and negative terminals.

The battery module is formed by several to tens of unit cells stacked together and electrically connected to each other. In order to fix the stacked unit cells, end plates are disposed on both outermost unit cells among the stacked unit cells. The end plates are typically connected to each other by connecting rods and nuts so as to fix the stacked unit cells by applying pressing force to the stacked unit cells.

However, with the conventional battery module, it is time-consuming to connect the connecting rods to the end plates.

Furthermore, since the connecting rods and the nuts coupled to the connecting rods project to the outside of the stacked unit cells, the volume of the battery module increases. The increase in volume of the battery module, in turn, causes an increase of the volume of a device to which the battery module is typically installed. As such, device designs become limited.

Particularly, when the battery module is used as the power source for driving motors, such as those for hybrid electric vehicles, electric vehicles, electric scooters, electric bicycles, vacuum cleaners, or the like, there is a need to minimize the volume of the battery module considering the limited battery module installing space of the devices.

SUMMARY OF THE INVENTION

The present invention provides a battery module whose volume can be minimized by improving the coupling structure of end plates.

The present invention also provides a battery module that can increase productivity by reducing the time required for battery module assembly.

According to an exemplary embodiment of the present invention, a battery module includes a battery body having a plurality of unit cells arranged in series and including a respective barrier disposed between adjacent unit cells. End plates are disposed on opposite outermost sides of the battery body. A fixing unit fixes together the end plates and the battery body by enclosing an outer circumference of an assembly of the end plates and the battery body.

The fixing unit may be formed of a band having a width greater than a thickness, the band enclosing the outer circumference of an assembly of the end plates and the battery body The battery module may further include a coupling unit for connecting opposite ends of the fixing unit. The coupling unit may include right-handed and left-handed screws respectively installed on the opposite ends of the fixing unit and a turnbuckle screw-coupled to the right-handed and left-handed screws. The coupling unit may further include connecting members respectively installed on the opposite ends of the fixing unit, the right-handed and left-handed screws being installed on outer surfaces of the connecting members to face each other.

Alternatively, the coupling unit may include female and male members respectively installed on the opposite ends of the fixing unit and engaged with each other and a pin inserted in holes penetrating the female and male members to couple the female and male members to each other.

The coupling unit may further include connecting members respectively installed on the opposite ends of the coupling unit, the female and male members being installed on outer surfaces of the connecting members.

Alternatively, the coupling unit may include interlocking members disposed on the opposite ends of the fixing unit and interlocked with each other.

At least one of the end plates may be provided with a groove for receiving the coupling unit. In addition, the end plates may be provided with a fixing unit receiving groove in which the fixing unit is partly received. A thickness of the end plate may increase gradually from outer side ends to a vertical central portion.

Each of the end plates may have an outer surface that is arc-shaped rounded in a direction where the fixing unit surrounds the assembly.

According to another exemplary embodiment of the present invention, there is provided a battery module having a battery body including a plurality of unit cells arranged in series and a respective barrier disposed between adjacent unit cells. A fixing unit surrounds and fixes together the battery body.

The fixing unit may be formed of a band having a width greater than a thickness.

The battery module may further include a coupling unit for connecting opposite ends of the fixing unit. The coupling unit may include right-handed and left-handed screws respectively installed on the opposite ends of the fixing unit and a turnbuckle screw-coupled to the left-handed and right-handed screws.

As described in the above, the battery module may not include end plates.

The battery module may be used for driving a motor such as those for hybrid electric vehicles, electric vehicles, electric scooters, electric bicycles, wireless vacuum cleaners, or the like.

DETAILED DESCRIPTION

Figure 1:
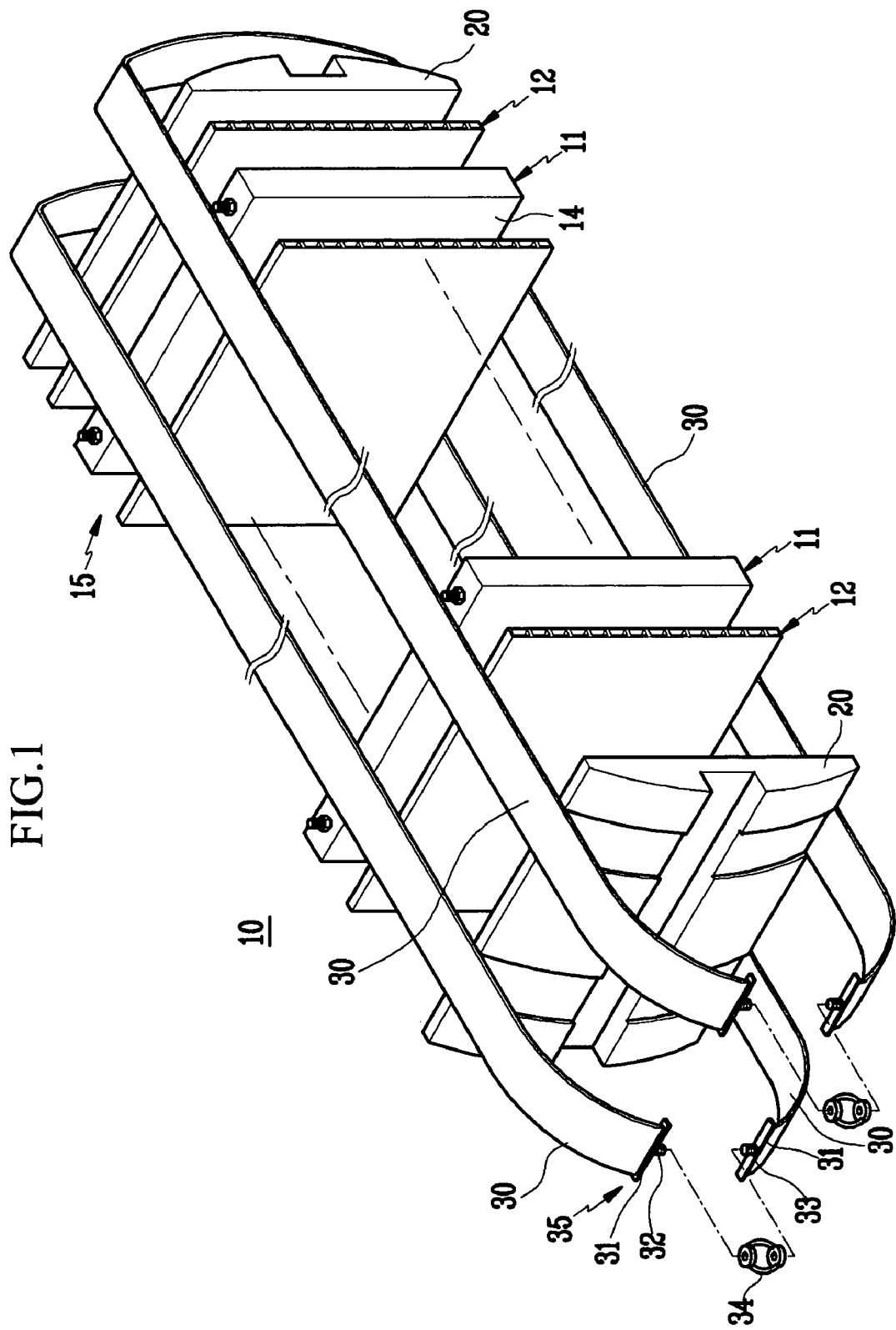
FIG. 1 is an exploded perspective view of a battery module according to an embodiment of the present invention.

Referring to FIG. 1, a battery module 10 according to an embodiment of the present invention includes a plurality of unit cells 11 arranged serially and spaced apart from each other at predetermined intervals.

Each of the unit cells 11 is a rechargeable battery including an electrode assembly having positive and negative electrodes between which a separator is interposed and a prismatic case 14 receiving the electrode assembly.

Disposed between the unit cells 11 are barriers 12 for allowing a cooling medium to flow between the unit cells 11.

The unit cells 11 and the barriers 12 disposed between the unit cells 12 define a battery body 15. That is, the battery module 10 includes the battery body 15 having the unit cells 11 and the barriers 12.

The battery module 10 further includes a pair of end plates 20 contacting closely outer surfaces of the barriers 12 disposed at opposite outermost sides of the battery body 15. However, the present invention is not limited to this case. That is, an embodiment of a battery module in accordance with the present invention may not include end plates 20.

A plurality of cooling medium flowing passages are formed on each of the barriers 12 and are spaced apart from each other at a predetermined distance. Alternatively, the barrier 12 may be formed of a plate that is bent in a zigzag shape to define a plurality of cooling medium channels. Also, the barrier 12 may be formed of a plate having a front surface provided with a plurality of projections. That is, any structure that can allow the cooling medium to flow may be used for the barriers.

In order to securely fix the end plates 20 to the battery body 15, the battery module 10 includes a fixing unit enclosing outer surfaces of the end plates 20 and the battery body 15 and a coupling unit 35 formed on opposite ends of the fixing unit to connect the opposite ends of the fixing unit to each other. Of course, the battery module 10 may not include the end plates 20.

A variety of structures may be used for the fixing unit. In the present embodiment the fixing unit includes one or more bands 30. Each of the bands 30 has a predetermined thickness and a width greater than the thickness. Each of the bands 30 surrounds by one turn the assembly of the battery body 15 with the end plates 20 contacting closely the opposite side ends of the battery body 15 and opposite ends of the band 30 connecting to each other at a vertical center portion of one of the end plates 20.

The bands 30 are flexible in response to the contour of the assembly of the battery body 15 and the end plate 20 so that they can contact closely the assembly of the battery body 13 and the end plate 20.

As described above, since the battery body 15 is fixed by the band 30 that is relatively thin, the volume of the battery body 15 can be reduced.

Figure 4:
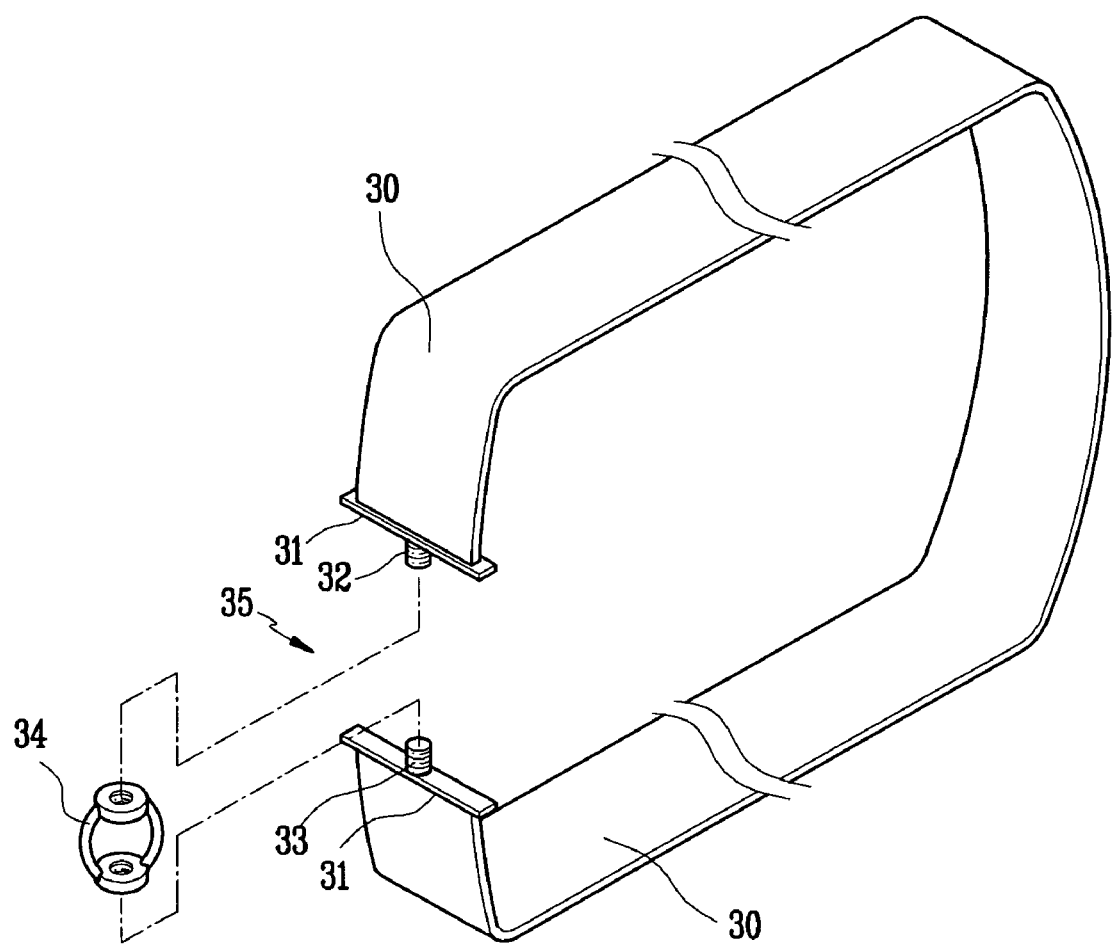
FIG. 4 is a perspective view of a coupling unit depicted in FIG. 1.

Referring now to FIG. 4, coupling unit 35 is provided to connect the opposite ends of the band 30 to each other. The coupling unit 35 includes connecting members 31, a left-handed screw 32, a right-handed screw 33, and a turnbuckle 34.

The connecting members 31 function as intermediate media for easily installing the left-handed screw 32 and right-handed screw 33 on the band 30 that is relatively thin and wide. The connecting members 31 are rectangular bodies each having a sufficient thickness for installing the left-handed screw 32 and right-handed screw 33. The opposite ends of the band 30 are adhered to respective first surfaces of the connecting members 31. The left-handed and right-handed screws 32 and 33 are installed on respective second surfaces of the connecting members 31, the second surfaces being opposite to the first surfaces.

That is, the connecting members 31 are installed on the opposite ends of the band 30. The left-handed screw 32 and right-handed screw 33 are installed on facing surfaces of the connecting members 31.

The turnbuckle 34 is screw coupled to the left-handed screw 32 and to the right-handed screw 33.

Therefore, the opposite ends of the band 30 are connected to the turnbuckle 34 via the left-handed screw 32 and right-handed screw 33. When the turnbuckle 34 rotates in a direction, the left-handed screw 32 and right-handed screw 33 that are screw-coupled to the turnbuckle 34 move toward each other or away from each other.

The turnbuckle 34 is provided at opposite ends with threads. However, the size and shape of the turnbuckle 34 may vary in accordance with the corresponding left-handed screw 32 and right-handed screw 33.

Figure 2:
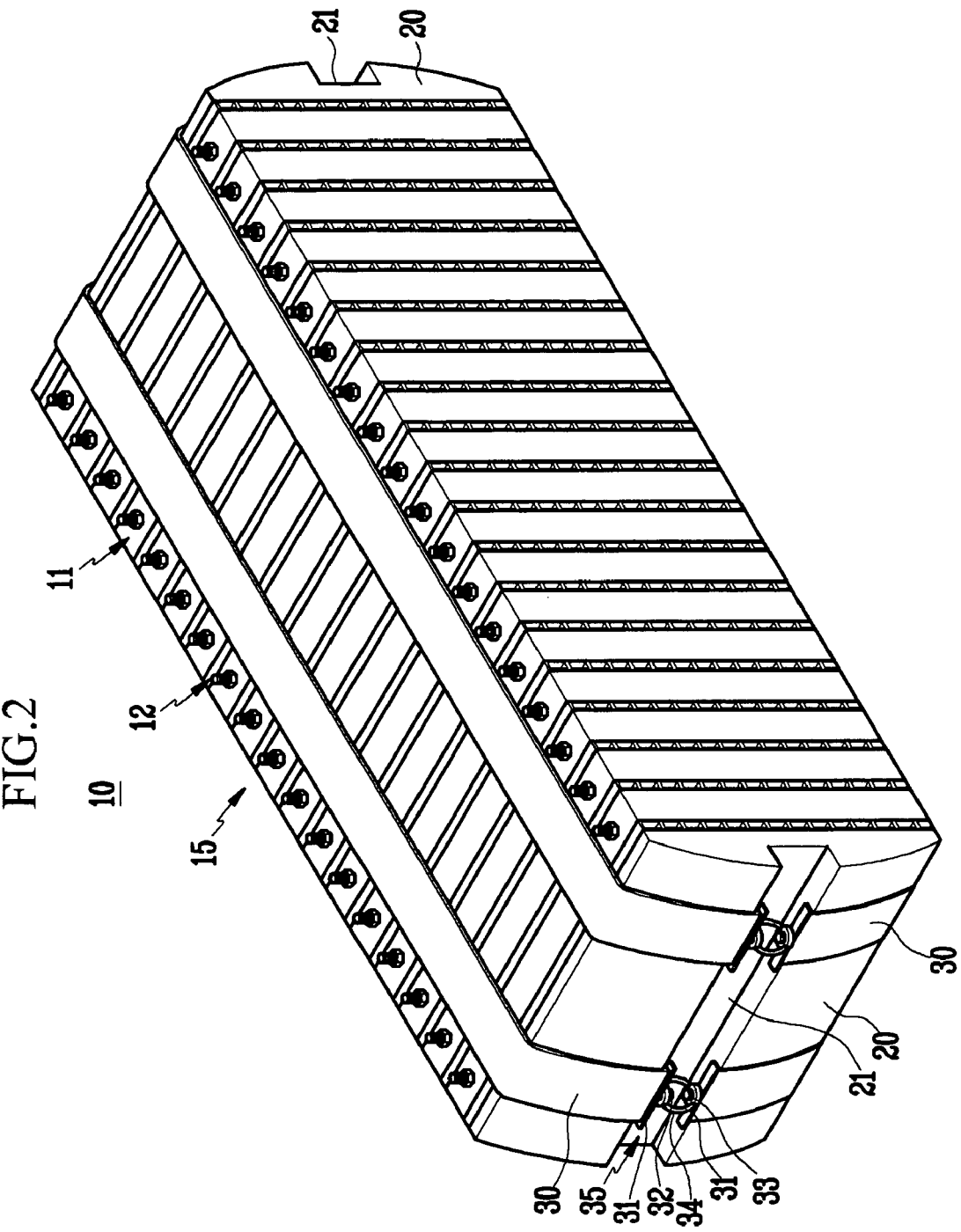
FIG. 2 is a perspective view of the battery module depicted in FIG. 1, when it is assembled.
Figure 3:
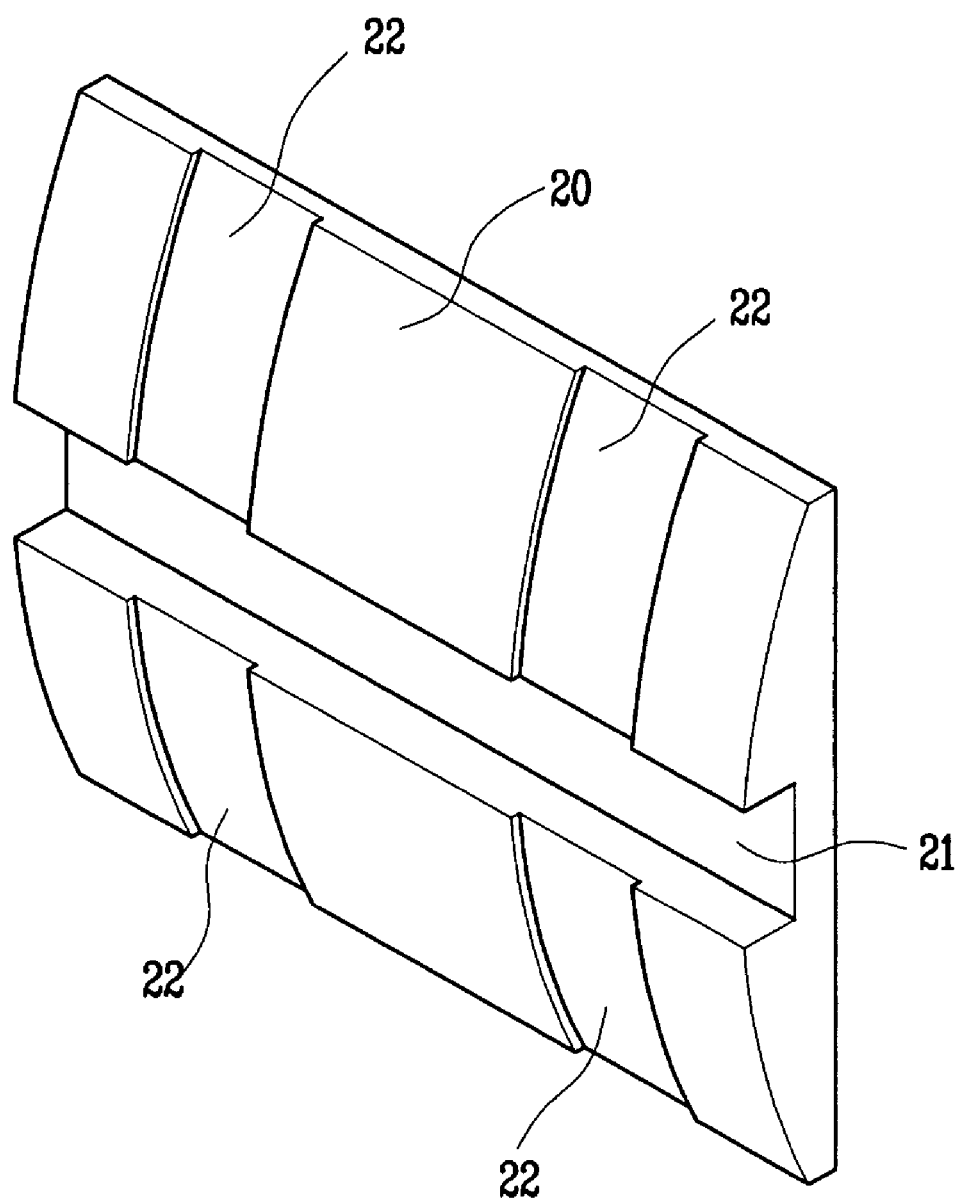
FIG. 3 is a perspective view of an end plate depicted in FIG. 1.

Referring now to FIG. 2, the left-handed screw 32 and right-handed screw 33 are screw-coupled to the turnbuckle 34 so that the band 30 tightly fixes the assembly of the end plates 20 and the battery body 15 together.

In this embodiment, the coupling unit 35 for fixing the band 30 is placed at an outer facing front surface of the end plate 20. At this point, the coupling unit 35 needs to be prevented from interfering with the end plate 20.

Therefore, according to the present embodiment, the end plate 20 is provided at a vertical central portion corresponding to a location where the coupling unit 35 is placed with a groove 21 providing a space in which the coupling unit 35 can sufficiently move.

Figure 5:
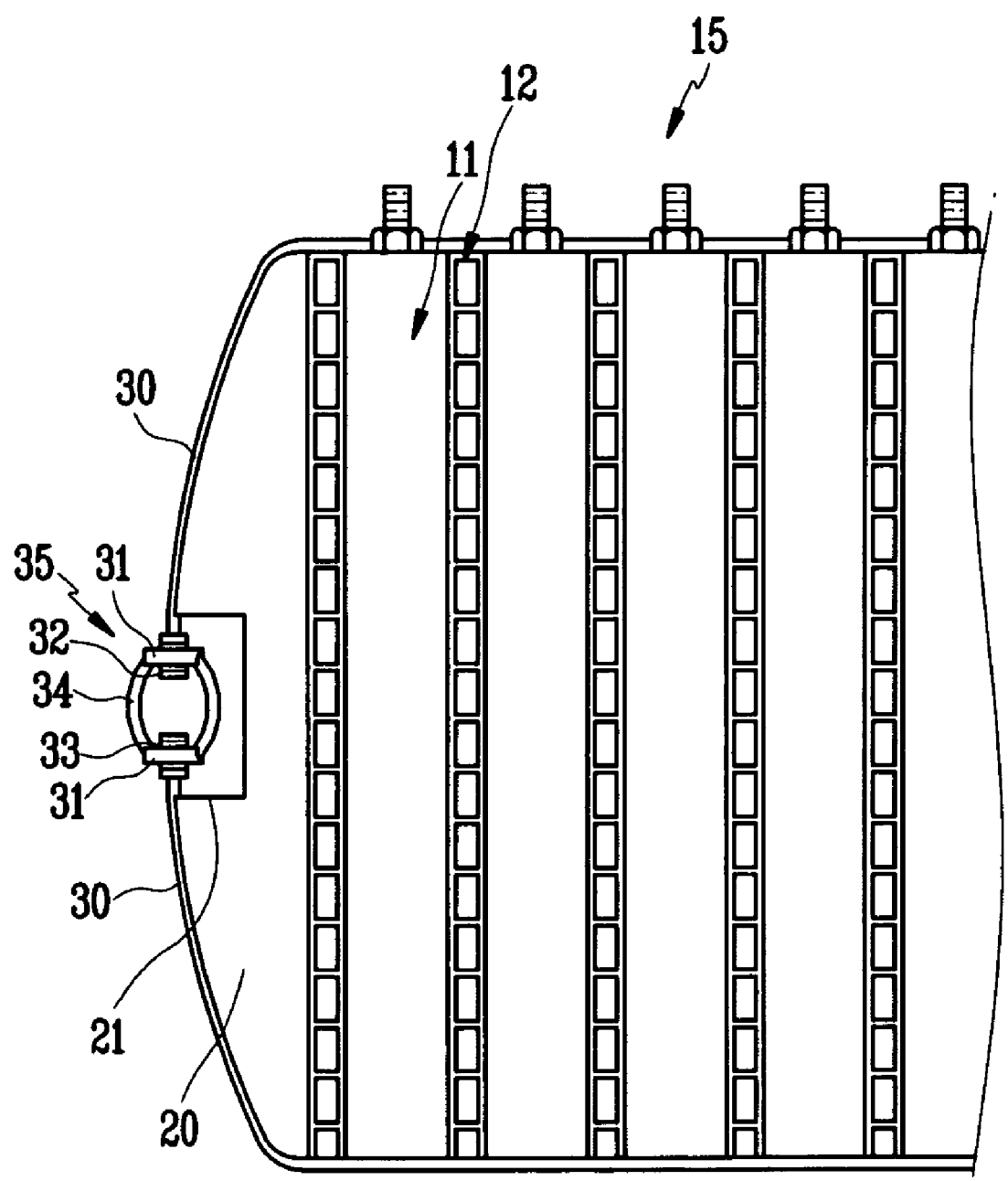
FIG. 5 is a side view of FIG. 2.

Therefore, as shown in FIG. 5, the turnbuckle 34 can rotate in the groove 21 without interfering with the end plate 20. As a result, the turnbuckle 34 fixes and tightens the band 30 at proper pressure.

In addition, the end plates 20 include band receiving grooves 22, each having a width corresponding to that of the band 30. A depth of each groove 22 is not limited to a specific level. However, the depth of each groove 22 may be set to correspond to the thickness of the band 30. As the bands 30 are received in the grooves 22, the bands 30 are securely fixed around the assembly of the end plates 20 and the battery body 15 without moving.

Also, each of the end plates 20 has an outer surface that is arc-shaped rounded in a direction where the fixing unit surrounds the assembly such that a thickness of the end plates 20 increases gradually from their outer ends to their vertical center.

The rounded structure of the end plates 20 allows the band 30 to be gently bent along the outer surfaces of the end plates 20. In addition, since the thickness of the vertical center portion of each end plate 20 is relatively thick, the strength of the vertical center portion of the end plate 20 is not reduced even when the groove 21 is formed on the vertical center portion of the end plate 20.

Figure 6:
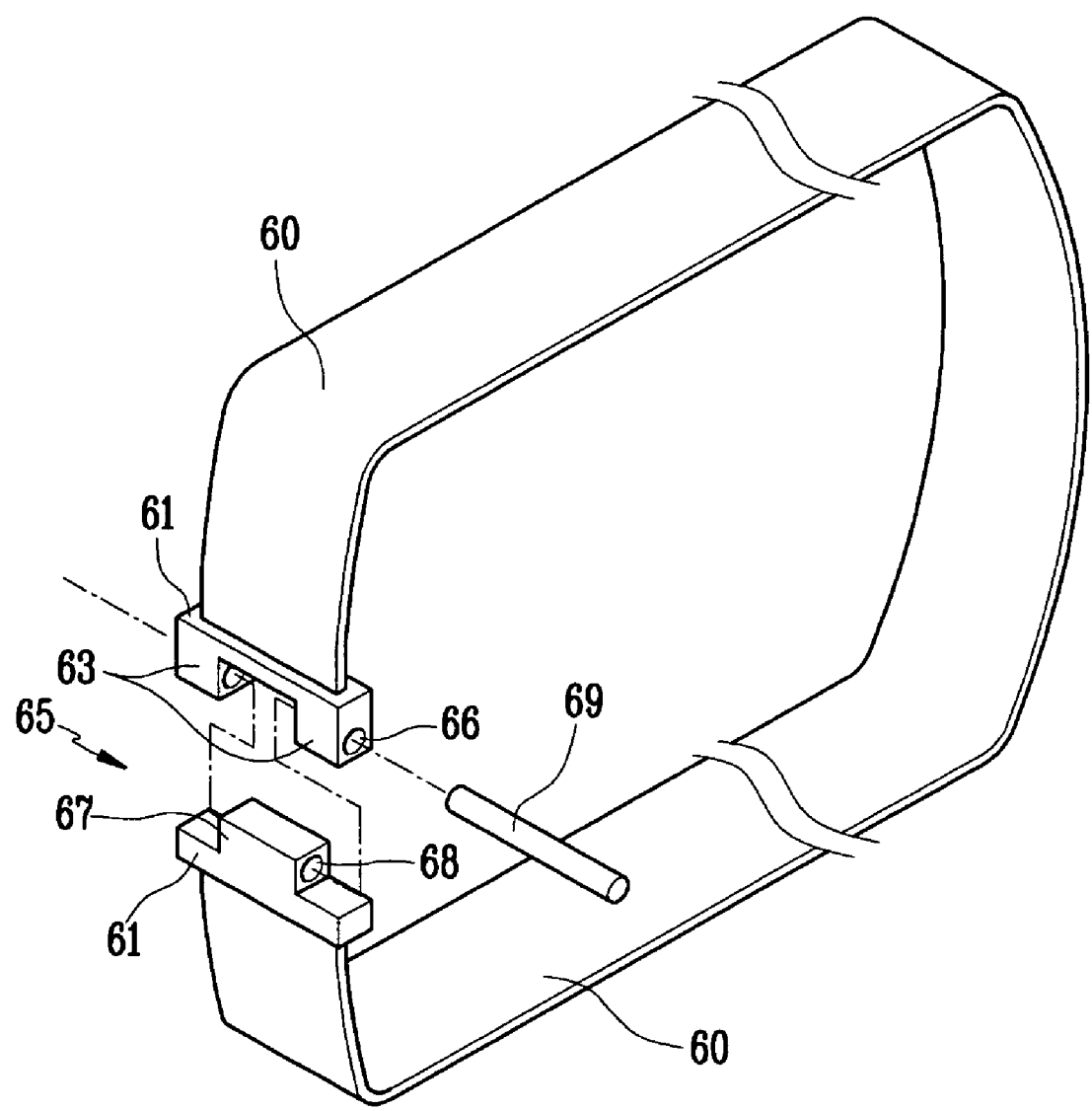
FIG. 6 is a perspective view of a band and a coupling unit of a battery module according to another embodiment of the present invention.
Figure 7:
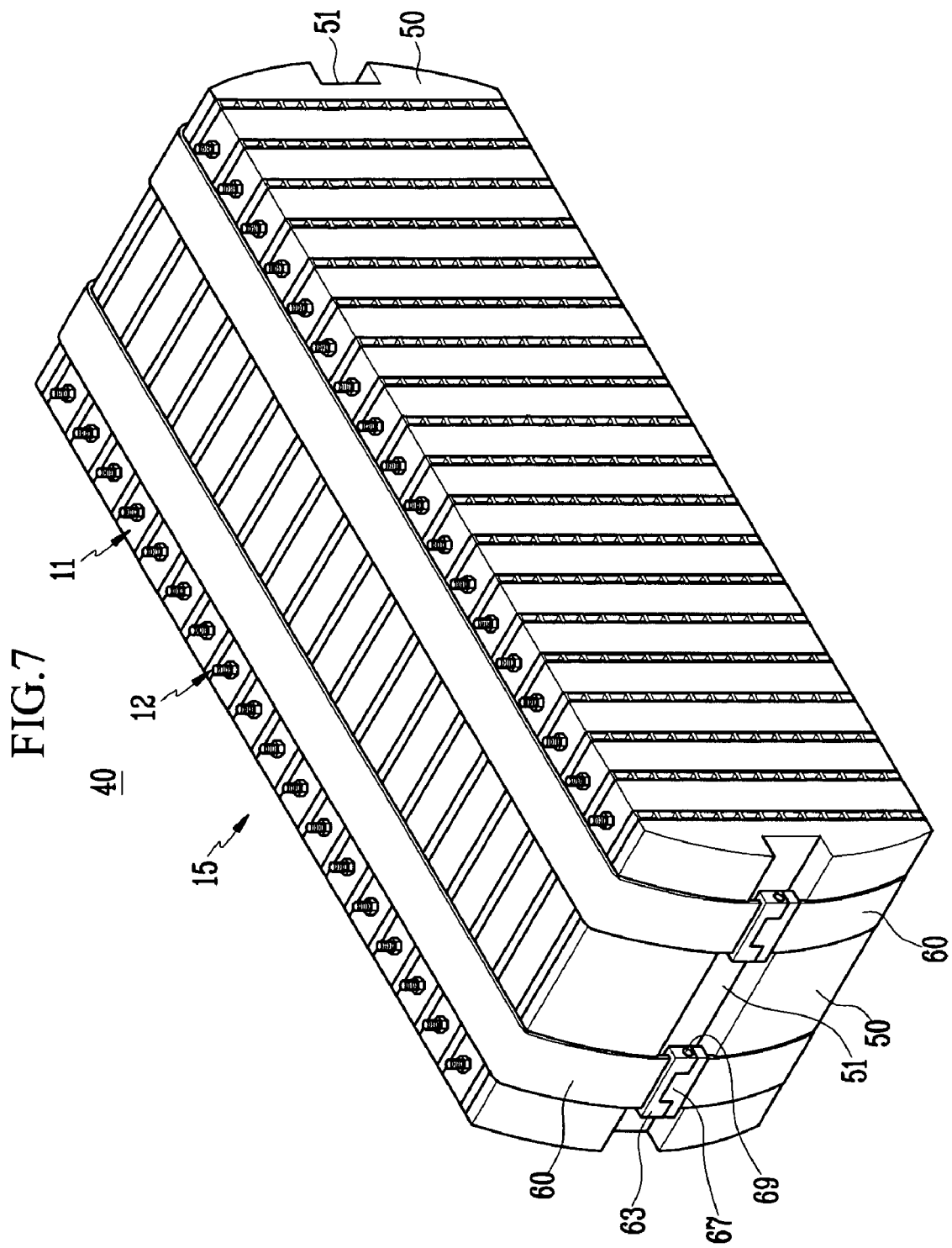
FIG. 7 is a perspective view of a battery module to which the band and coupling unit of FIG. 6 are applied.

FIGS. 6 and 7 show a battery module 40 according to another embodiment of the present invention. A coupling unit 65 includes rectangular connecting member 61 installed on opposite ends of a band 60, female member 63 and male member 67 that can be engaged with each other, and a pin 69 insertable into holes 66, 68 formed through the female member 63 and male member 67 to couple the female member 63 and male member 67 to each other.

After the band 60 surrounds the assembly of the end plates 50 and the battery body 15 by one turn, the female member 63 and male member 67 installed on the opposite ends of the band 60 are engaged with each other. Then, the holes 66, 68 formed through the female member 63 and male member 67 are aligned with each other. The pin 69 is then inserted in the holes 66, 68 so that the female and male members 63 remain coupled to each other.

Here, the coupling unit 65, including the female member 63 and male member 67 and the connecting members 61, is placed at a groove 51 formed on a vertical center of an end plate 50. Therefore, the coupling unit 65 does not interfere with the end plate 50.

Figure 8:
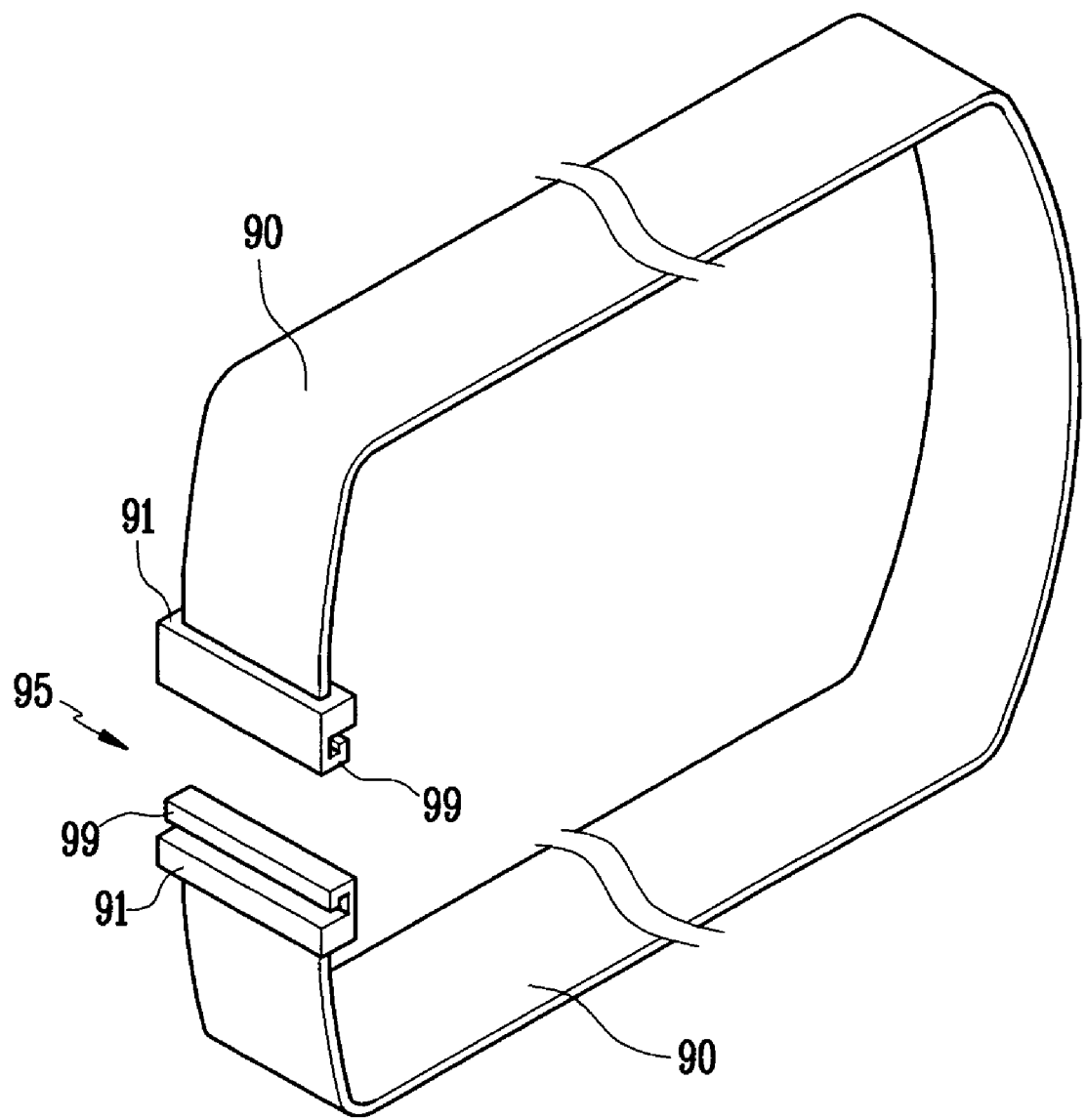
FIG. 8 is a perspective view of a band and a coupling unit of a battery module according to another embodiment of the present invention.
Figure 9:
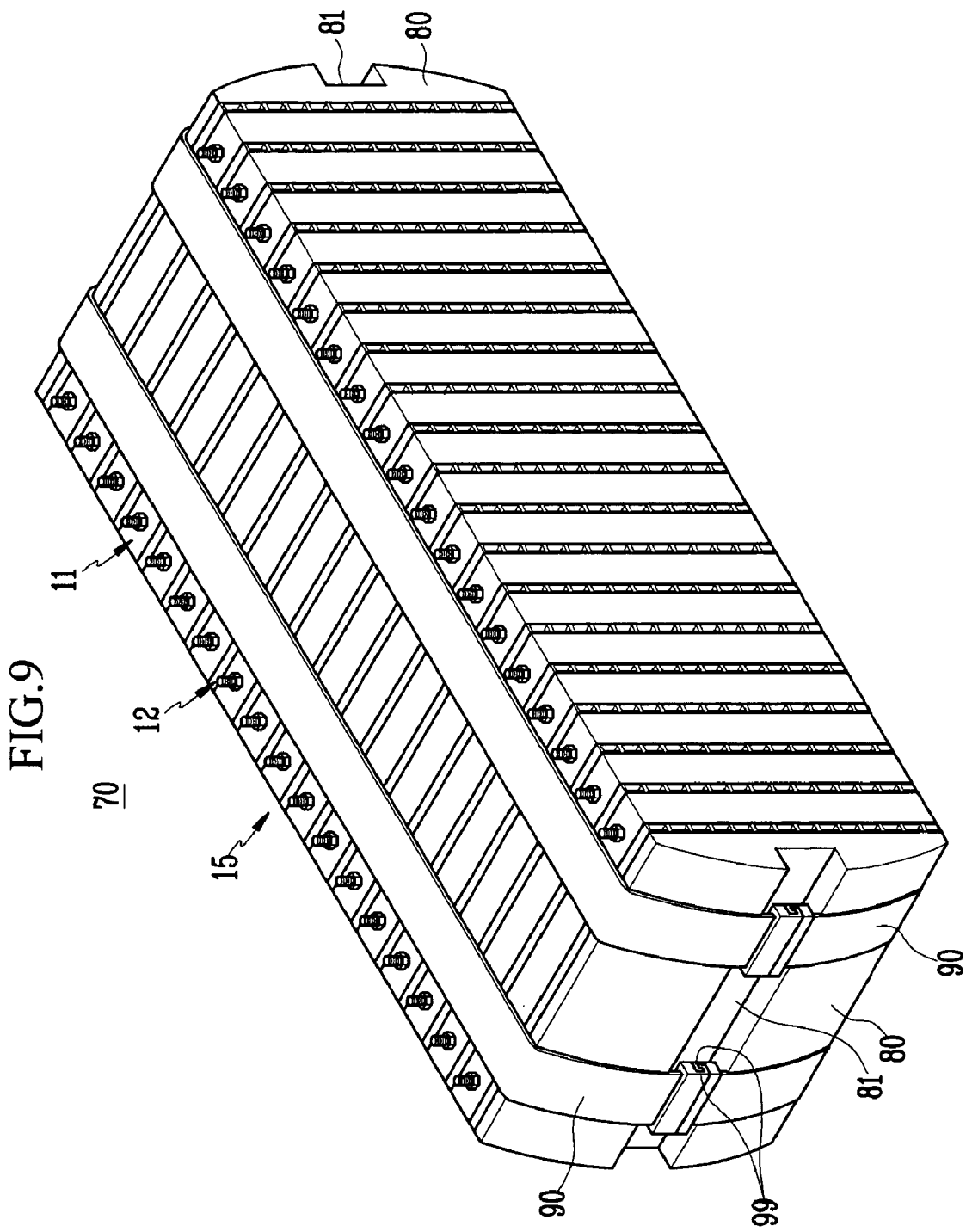
FIG. 9 is a perspective view of a battery module to which the band and coupling unit of FIG. 8 are applied.

FIGS. 8 and 9 show a battery module 70 according to yet another embodiment of the present invention. A coupling unit 95 is provided in the form of a clip. That is, the coupling unit 95 includes generally rectangular connecting members 92 installed on opposite ends of a band 90, and interlocking members 99 integrally formed with the connecting members 91 and facing each other to be interlocked with each other. By the interlocking of the interlocking members 99, the opposite ends of the band 90 are connected to each other.

Each interlocking member 99 is bent in a hook shape. The interlocking members 99 are bent in an opposite direction to each other so that they can be engaged with each other.

Since the coupling unit 95 including the connecting members 91 and the interlocking members 99 is placed at a groove 81 formed on a vertical center portion of the end plate 80, the coupling unit 95 does not interfere with the end plate 80.

When coupling units 65, 95 are formed as shown in FIG. 6 or 8, a gap between the opposite ends of the bands 60, 90 cannot be adjusted. Therefore, a length of the bands 60, 90 is set to correspond to a circumferential length of the assembly of the end plates 50, 80 and the battery body 15 so that the bands 60, 90 can fix and tighten the assembly of the end plates 50, 80 and the battery body 15.

Figure 10:
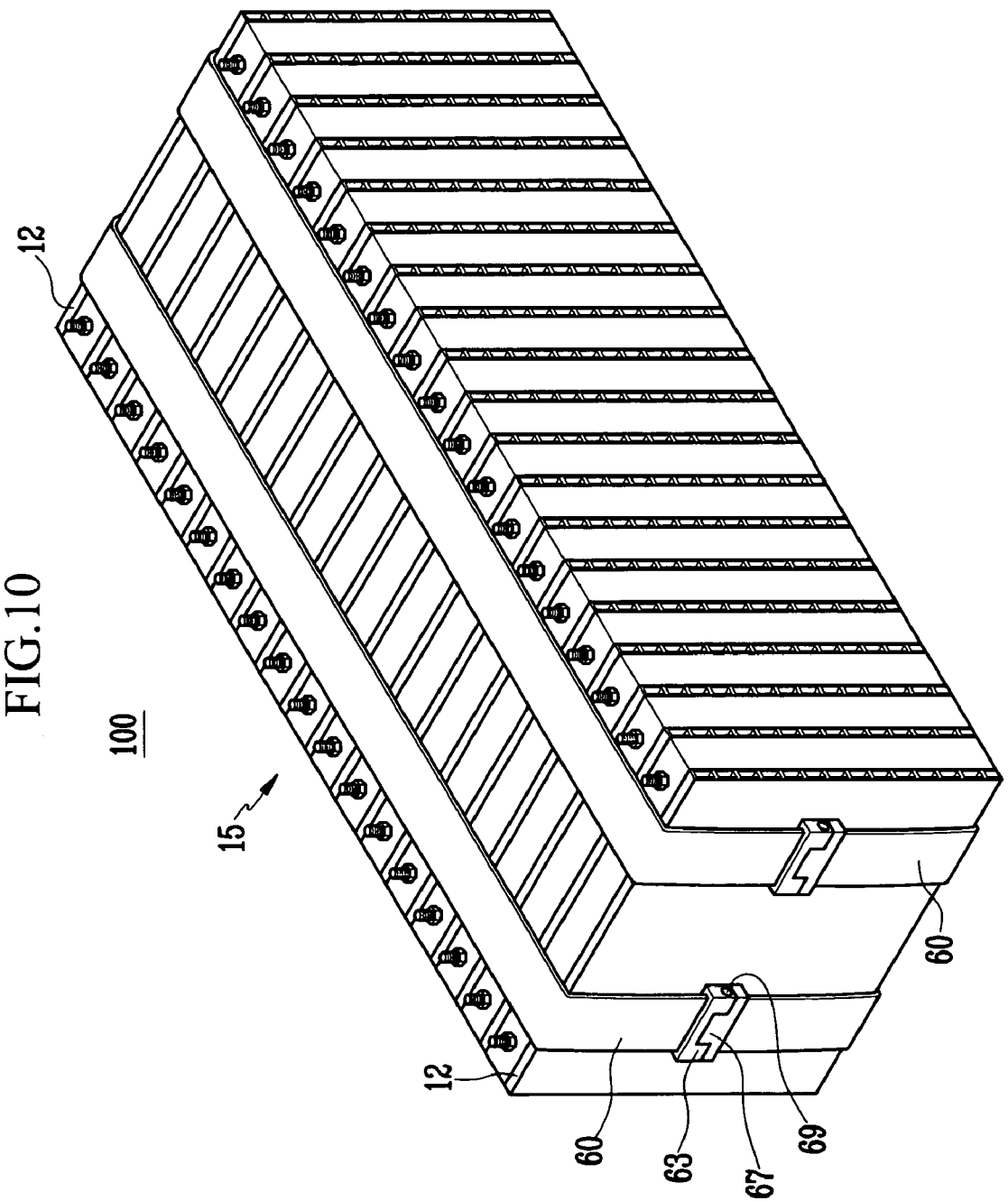
FIG. 10 is a perspective view of a battery module without end plates to which the band and coupling unit of FIG. 6 are applied.

FIG. 10 shows a battery module 100 according to another embodiment of the present invention wherein the coupling unit of FIG. 6 surrounds a battery body 15 that does not have end plates 50 of the previous embodiments terminating the ends of the battery body. Rather the battery body 15 terminates in a respective barrier 12. The representative coupling unit shown includes a rectangular connecting member installed on opposite ends of a band 60, female member 63 and male member 67 that can be engaged with each other, and a pin 69 insertable into the holes formed through the female member 63 and male member 67 to couple the female member 63 and male member 67 to each other.

Figure 11:
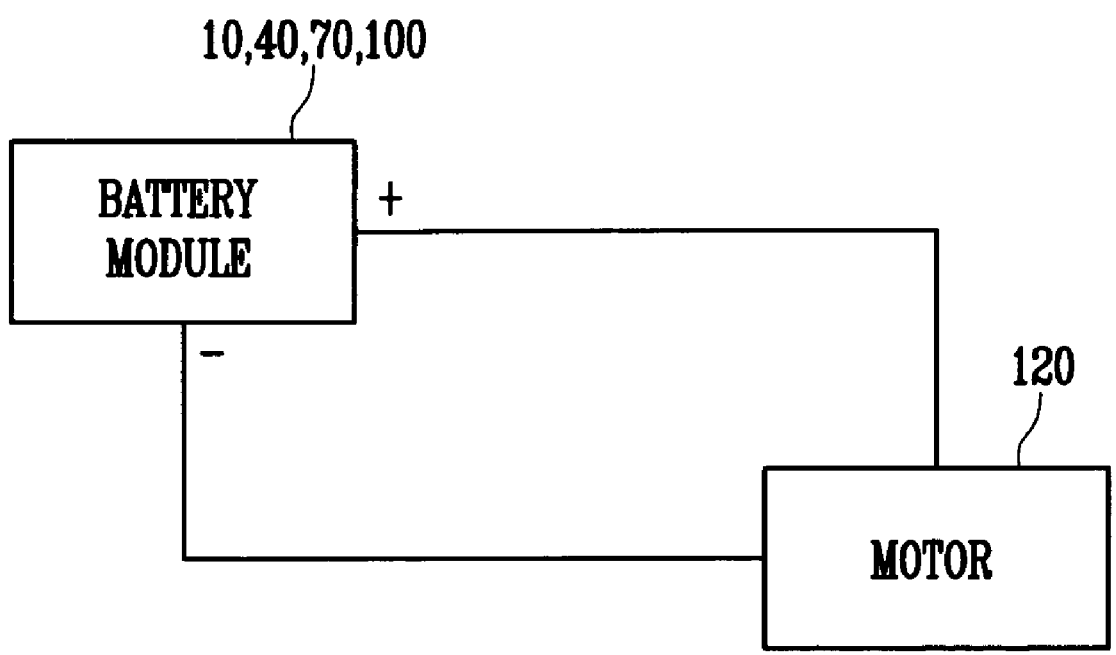
FIG. 11 is a block diagram showing how a battery module which is fabricated in accordance with one of the embodiments of the present invention are electrically connected to operate a motor.

FIG. 11 is a block view showing how battery modules 10, 40, 70, 100 may be connected to a motor 120.

The battery modules 10, 40, 70, 100 of the embodiments of the present invention can be used as a power source for driving a motor 120 of a motor-driven device, such as a hybrid electric automobile (HEV), an electric vehicle (EV), an electric cleaner, and an electric scooter.

According to the present invention, since the volume of the battery module can be minimized, the design flexibility of the device to which the battery module will be installed or applied can be enhanced.

In addition, since the battery module can be easily assembled, the assembly productivity of the battery modules can be improved.

The battery modules according to the foregoing embodiments can be used as the power source for driving motors, such as those for hybrid electric vehicles, electric vehicles, electric scooters, electric bicycles, wireless vacuum cleaners, or the like.

Although exemplary embodiments of the present invention have been shown and described, it will be appreciated by those skilled in the art that changes may be made in this embodiment without departing from the principles and spirit of the invention, the scope of which is defined in the claims and their equivalents.

For example, although a battery module having a prismatic type unit cell is representatively described, the present invention is not only applicable to this type unit cell. The present invention can be applied to a battery module having a cylindrical type unit cells. Further, although barrier members channeling air is described, the present invention is not limited to the use of air as the cooling medium. Water or other fluids may be used as the cooling medium and, accordingly, barrier members channeling water or other fluids could be correspondingly used.

What is claimed is:
1. A battery module comprising:
   a battery body comprising a plurality of unit cells arranged in series and a respective barrier between adjacent ones of the unit cells;
   end plates on opposite outermost sides of the battery body;
   a fixing unit for fixing together the end plates and the battery body, the fixing unit being adapted to encircle an outer periphery of an assembly of the end plates and the battery body;
   a coupling unit for coupling opposite ends of the fixing unit to each other,
   wherein at least one of the end plates has a groove for receiving the coupling unit,
   wherein the end plates have a fixing unit receiving groove in which the fixing unit is partly received, and
   wherein the groove for receiving the coupling unit crosses the fixing unit receiving groove and has a greater depth than the fixing unit receiving groove.
2. The battery module of claim 1, wherein the fixing unit comprises a band having a width greater than a thickness, the band being adapted to encircle the outer periphery of the assembly of the end plates and the battery body.

3. The battery module of claim 1, wherein:
the coupling unit comprises: connecting members on the opposite ends of the fixing unit; and a right-handed screw and a left-handed screw on outer surfaces of the connecting members, the right-handed screw and the left-handed facing each other.

4. A battery module comprising:
a battery body comprising a plurality of unit cells arranged in series and a respective barrier between adjacent ones of the unit cells;
end plates on opposite outermost sides of the battery body; and
a fixing unit for fixing together the end plates and the battery body, the fixing unit being adapted to encircle an outer periphery of an assembly of the end plates and the battery body;
a coupling unit for coupling opposite ends of the fixing unit to each other,
wherein the coupling unit comprises:
a female member and a male member respectively installed on the opposite ends of the fixing unit, the female member and the male member being engageable with each other, and
a pin insertable through holes in the female member and the male member to couple the female member and the male member to each other,
wherein at least one of the end plates has a groove for receiving the coupling unit,
wherein the end plates have a fixing unit receiving groove in which the fixing unit is partly received, and
wherein the groove for receiving the coupling unit crosses the fixing unit receiving groove and has a greater depth than the fixing unit receiving groove.

5. The battery module of claim 4, wherein:
the coupling unit further comprises connecting members on the opposite ends of the fixing unit, and
the female member and the male member are on outer surfaces of the connecting members.

6. A battery module comprising:
a battery body comprising a plurality of unit cells arranged in series and a respective barrier between adjacent ones of the unit cells;
end plates on opposite outermost sides of the battery body; and
a fixing unit for fixing together the end plates and the battery body, the fixing unit being adapted to encircle an outer periphery of an assembly of the end plates and the battery body;
a coupling unit for coupling opposite ends of the fixing unit to each other,
wherein the coupling unit comprises interlocking members on the opposite ends of the fixing unit, the interlocking members being interlockable with each other,
wherein at least one of the end plates has a groove for receiving the coupling unit,
wherein the end plates have a fixing unit receiving groove in which the fixing unit is partly received, and
wherein the groove for receiving the coupling unit crosses the fixing unit receiving groove and has a greater depth than the fixing unit receiving groove.

7. The battery module of claim 6, wherein a thickness of the end plate increases gradually from end plate outer side ends to an end plate inner central portion.

8. The battery module of claim 1, wherein each of the end plates has an outer surface that is arc-shaped rounded in a direction where the fixing unit encircles the assembly.

9. The battery module of claim 1, wherein the battery is adapted to drive a motor.

10. A battery module comprising:
a battery body comprising a plurality of unit cells arranged in series and a respective barrier between adjacent ones of the unit cells;
end plates on opposite outermost sides of the battery body;
a fixing unit encircling the battery body and adapted to fix together the battery body; and
a coupling unit for coupling opposite ends of the fixing unit to each other, the coupling unit comprising a right-handed screw and a left-handed screw respectively installed on the opposite ends of the fixing unit, and a turnbuckle screw-coupled to the right-handed screw and to the left-handed screw,
wherein at least one of the end plates has a groove for receiving the coupling unit,
wherein the end plates have a fixing unit receiving groove in which the fixing unit is partly received,
wherein the groove for receiving the coupling unit and the fixing unit receiving groove cross each other on the at least one of the end plates, and
wherein the groove for receiving the coupling unit has a greater depth than the fixing unit receiving groove.

11. The battery module of claim 10, wherein the fixing unit comprises a band having a width greater than a thickness, the band being adapted to encircle an outer periphery of the battery body.

12. A battery module comprising:
a battery body comprising a plurality of unit cells arranged in series and a respective barrier between adjacent ones of the unit cells;
end plates on opposite outermost sides of the battery body;
a fixing unit encircling the battery body and adapted to fix together the battery body;
a coupling unit for coupling opposite ends of the fixing unit to each other,
wherein the coupling unit comprises:
a female member and a male member respectively installed on the opposite ends of the fixing unit, the female member and the male member being engageable with each other, and
a pin insertable through holes in the female member and the male member to couple the female member and the male member to each other,
wherein at least one of the end plates has a groove for receiving the coupling unit,
wherein the end plates have a fixing unit receiving groove in which the fixing unit is partly received,
wherein the groove for receiving the coupling unit and the fixing unit receiving groove cross each other on the at least one of the end plates, and
wherein the groove for receiving the coupling unit has a greater depth than the fixing unit receiving groove.

13. A battery module comprising:
a battery body comprising a plurality of unit cells arranged in series and a respective barrier between adjacent ones of the unit cells;
end plates on opposite outermost sides of the battery body;
a fixing unit encircling the battery body and adapted to fix together the battery body;
a coupling unit for coupling opposite ends of the fixing unit to each other,
wherein the coupling unit comprises interlocking members on the opposite ends of the fixing unit, the interlocking members being interlockable with each other, wherein at least one of the end plates has a groove for receiving the coupling unit, wherein the end plates have a fixing unit receiving groove in which the fixing unit is partly received, wherein the groove for receiving the coupling unit and the fixing unit receiving groove cross each other on the at least one of the end plates, and wherein the groove for receiving the coupling unit has a greater depth than the fixing unit receiving groove.

14. The battery module of claim 10, wherein the battery module is adapted to drive a motor.

15. A method of coupling together as a battery module comprising a battery body comprising a plurality of unit cells arranged in series and a respective barrier between adjacent ones of the unit cells, the method comprising:

placing end plates having a fixing unit groove for receiving opposite ends of a fixing unit on opposite outermost sides of the battery body;

fixing the end plates to the battery body by encircling an outer periphery of an assembly of the end plates and the battery body with the fixing unit comprising a right-handed screw and a left-handed screw on the opposite ends of the fixing unit; and coupling the right-handed screw and the left-handed screw to each other to allow the opposite ends of the fixing unit to be received in the fixing unit groove, wherein at least one of the end plates has a groove for receiving the right-handed screw and the left-handed screw, wherein the end plates have a fixing unit receiving groove in which the fixing unit is partly received, and wherein the groove for receiving the right-handed screw and the left-handed screw crosses the fixing unit receiving groove and has a greater depth than the fixing unit receiving groove.

16. A method of coupling together a battery module comprising a plurality of unit cells arranged in series and a respective barrier disposed between adjacent ones of the unit cells, the method comprising:

placing end plates on opposite outermost sides of the battery body;

fixing the end plates to the battery body by encircling an outer periphery of an assembly of the end plates and the battery body with a fixing unit; and coupling opposite ends of the fixing unit to each other by engaging members on the opposite ends of the fixing unit that are interlockable with each other, wherein at least one of the end plates has a groove for receiving the interlockable members, wherein the end plates have a fixing unit receiving groove in which the fixing unit is partly received, wherein the groove for receiving the interlockable members and the fixing unit receiving groove cross each other on the at least one of the end plates; and wherein the groove for receiving the interlockable members has a greater depth than the fixing unit receiving groove.

* * * * *

UNITED STATES PATENT AND TRADEMARK OFFICE
CERTIFICATE OF CORRECTION

| | | |
|---|---|---|
| PATENT NO. | : 7,858,224 B2 | Page 1 of 1 |
| APPLICATION NO. | : 11/515205 | |
| DATED | : December 28, 2010 | |
| INVENTOR(S) | : Tae-Yong Kim et al. | |

It is certified that error appears in the above-identified patent and that said Letters Patent is hereby corrected as shown below:

Column 7, Claim 3, line 6         After "left-handed"
                                  Insert -- screw --

Column 10, Claim 16, line 25      Delete "plates;"
                                  Insert -- plates, --

Signed and Sealed this
Thirty-first Day of January, 2012

David J. Kappos
*Director of the United States Patent and Trademark Office*